United States Patent [19]
Goeken

[11] Patent Number: 5,249,303
[45] Date of Patent: Sep. 28, 1993

[54] CONTINUOUS RECEPTION BY A MOBILE RECEIVER UNIT OF PROGRAM CHANNELS TRANSMITTED BY A SERIES OF TRANSMITTERS

[76] Inventor: John D. Goeken, 1444 W. Renwick Rd., Plainfield, Ill. 60544

[21] Appl. No.: 689,974

[22] Filed: Apr. 23, 1991

[51] Int. Cl.$^5$ ............................ H04B 1/16; H04B 7/26
[52] U.S. Cl. ................................. 455/33.4; 455/56.1; 455/134; 455/140; 455/161.3
[58] Field of Search ........................ 455/133–135, 455/140, 152.1, 161.1, 161.3, 164.2, 168.1, 187.1, 33.4, 38.1, 49.1, 56.1, 59

[56] References Cited

U.S. PATENT DOCUMENTS

| | | | |
|---|---|---|---|
| 4,881,273 | 11/1989 | Koyama et al. | 455/161.1 |
| 4,908,839 | 3/1990 | Morimoto et al. | 455/133 X |

FOREIGN PATENT DOCUMENTS

| | | | |
|---|---|---|---|
| 0100528 | 6/1983 | Japan | 455/161.3 |
| 0122310 | 5/1988 | Japan | 455/152.1 |
| 0060115 | 3/1989 | Japan | 455/152.1 |

Primary Examiner—Reinhard J. Eisenzopf
Assistant Examiner—Chi H. Pham
Attorney, Agent, or Firm—Lee, Mann, Smith, McWilliams, Sweeney & Ohlson

[57] ABSTRACT

A system and process for continuous reception of information by a mobile receiver unit passing among a plurality of spaced transmitters with each transmitter configured to individually transmit signals to the mobile receiver unit. The mobile receiver unit has a pair of scanning receivers controlled by a switching control module. The module causes one of the scanning receivers to lock onto signals transmitted from one of the transmitters while causing the second scanning receiver to scan signals transmitted by the transmitters in the reception range of the scanning receiver. Once the strength of the signal locked onto by the first scanning receiver falls below a predetermined minimum signal strength, the second scanning receiver locks onto the best suited received signal and the first scanning receiver is caused to commence scanning, the roles of the scanning receivers thus being reversed. The process continues, with the roles of the scanning receivers constantly being reversed, as the mobile receiver unit traverses the signals broadcast by the plurality of spaced transmitters.

15 Claims, 2 Drawing Sheets

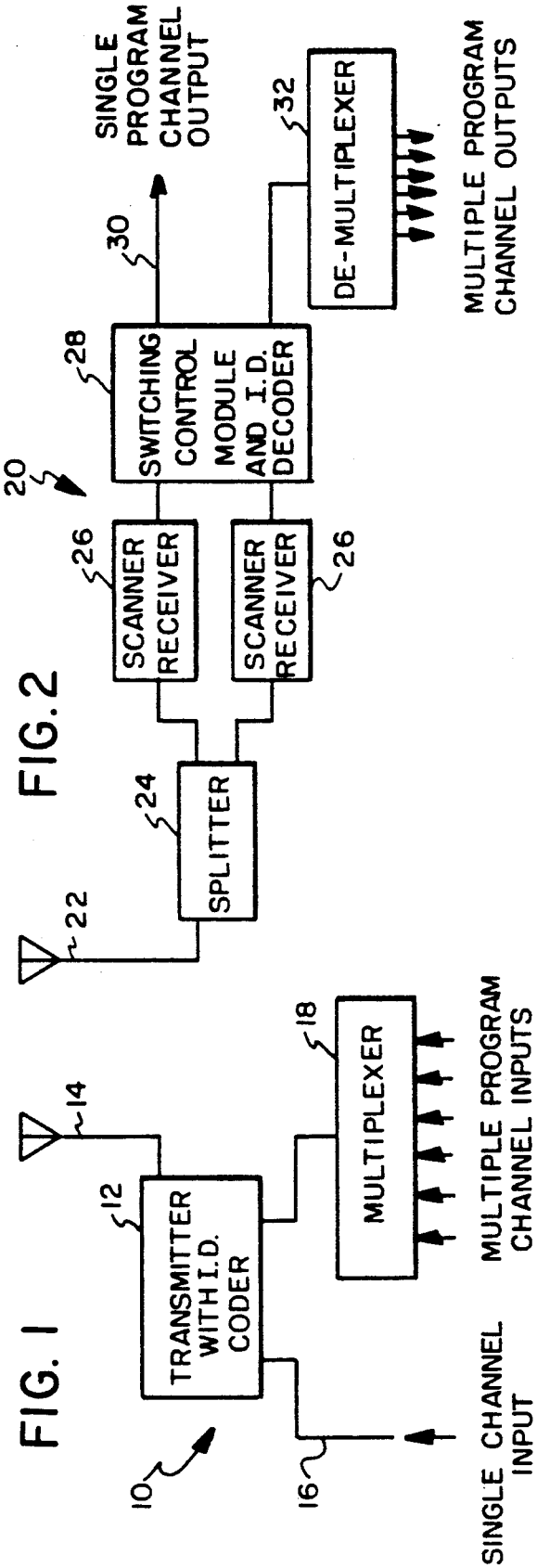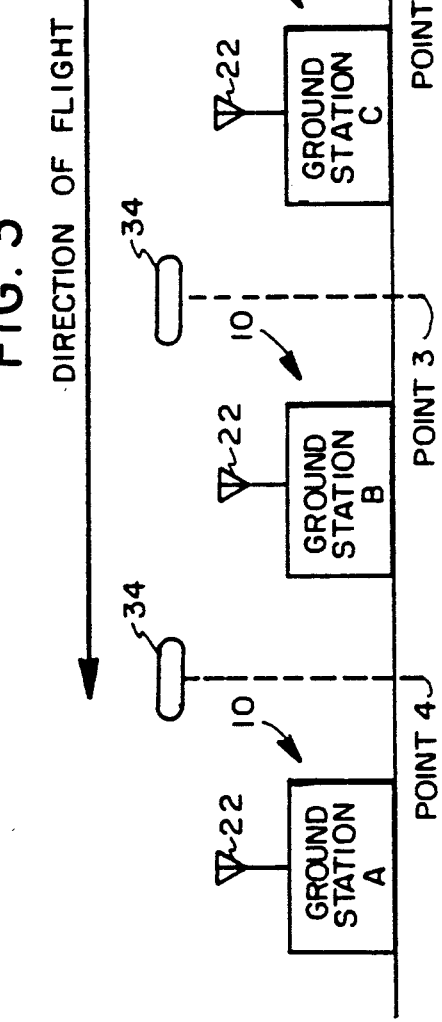

CONTINUOUS RECEPTION BY A MOBILE RECEIVER UNIT OF PROGRAM CHANNELS TRANSMITTED BY A SERIES OF TRANSMITTERS

BACKGROUND OF THE INVENTION

This invention relates to mobile reception of transmitted signals, and in particular to a system and process for continuous reception of information by a mobile receiver unit as the receiver unit passes among a plurality of spaced transmitters.

Program material, live or recorded, may be sent to the mobile receiver unit via radio, infrared or other means on a continuous basis as the mobile receiver unit travels out of range of an originating transmitter.

The present invention will be described primarily in relation to an aircraft while airborne and travelling cross country while receiving signals from transmitting ground stations. The invention, however, is equally applicable to travel in automobiles, buses, trains, water vessels, or any other conveyance in which reception of program information without interruption is desired.

It has been estimated by one major United States airline company that for each flight flown by the aircraft during a year, the difference of one passenger on each flight translates into a revenue difference of $170,000,000 annually. With increasing competition and concentration in the airline industry, it is imperative for an airline's survival that the airline provide state-of-the-art services to attract passengers. Those providing such services will experience growth of passenger revenue miles, while those unable or unwilling to provide services demanded by passengers and dictated by competition will see a decrease or stagnation of growth, and eventual unprofitability and failure.

In providing passenger services, conveniences for the passenger are paramount. For example, since about 1985, telephone service has been available in some aircraft flying in United States airspace. At first, telephones were available at only limited locations on a limited number of aircraft. More recently, however, telephones in some aircraft have been provided at seat back locations, thus increasing convenience to the passenger and utilization of the service, and thus generating additional revenue for the airline and the provider of the telephone service.

Telephone service, however, is only a small portion of services that could be provided to passengers. For example, news, sports events, flight information, hotel information, gate information and a myriad of other possible items of information and entertainment could be provided to passengers to not only inform them, but also reduce boredom on longer flights, thus increasing satisfaction of the customer and leading to greater utilization of aircraft and airlines providing such services.

The present invention is directed to receiving program information and other relevant information by an aircraft (or other mobile receiving unit) as it travels, without discernable interruption by the user. Whether travelling on the ground, in the air, or on the water, a mobile receiving unit operating in accordance with the present invention can continuously receive information and provide such information to passengers, crew, and anyone or anything else desiring access to the information received.

SUMMARY OF THE INVENTION

The invention provides a system for continuous reception of information by a mobile receiver unit. It includes a plurality of spaced transmitters, each having means for transmitting signals on a particular transmission channel, with the transmitters within a predetermined proximity of one another being configured to transmit signals on a continuous, non-interfering basis. A pair of scanning receivers is located in each mobile receiver unit. Each scanning receiver includes means for scanning the channels transmitted by the transmitters for selection of one of the scanned channels. Means is provided for controlling the scanning receivers, the controlling means including means for causing one of the scanning receivers to lock onto signals transmitted from a selected one of the transmitters while the second scanning receiver is caused to scan the channels transmitted by transmitters coming within reception range. The controlling means also includes means for comparing the strength of the signals locked onto by the first scanning receiver with a predetermined minimum signal strength. Means is provided in the controlling means for causing the second scanning receiver to lock onto signals received from a different selected one of the transmitters when the strength of the signals locked onto by the first scanning receiver falls below the predetermined minimum. At that point, the controlling means causes the first scanning receiver to release its locked signal, and commence scanning of the channels transmitted by the transmitters of the network.

In accordance with the preferred form of the invention, at least some of the transmitters each include multiplexer means for transmitting multiple program and information channels on the channel transmitted by the transmitter, and the mobile receiver unit includes a de-multiplexer connected to the scanning receivers. Also, each transmitter includes means for encoding the signals it transmits, and the scanning receivers of the mobile receiver unit include means for recognizing only the encoded signals. Preferably also, each scanning receiver includes means to log received channels when scanning, so long as the received channels have a signal strength exceeding a predetermined minimum.

In accordance with the process of the invention, one of the scanning receivers is caused to lock onto signals transmitted from a selected one of the transmitters. The other scanning receiver is caused to scan signals received from the transmitters as the signals increase in signal level or come into the reception area of the scanning receiver. The strength of the signals locked onto by the first scanning receiver is continuously compared with a predetermined minimum signal strength. When that minimum has been reached, the second scanning receiver is caused to lock onto the then best suited received signal based upon signal strength, doppler shift and phase angle. At that time, the first scanning receiver is released to commence scanning of signals received from the transmitters so that, when the signal to this second scanning receiver has been locked on falls below a predetermined minimum, the first scanning receiver can be caused to lock onto a new, stronger and better suited signal.

In accordance with the preferred form of the invention, initially upon start-up, both of the scanning receivers are caused to scan signals received from the transmitters. Only one of the scanning receivers is caused to lock onto received signals after the initial scanning.

To minimize the signals scanned by the scanning receiver that is in the scanning mode, in accordance with the process of the invention, only signals exceeding a predetermined signal strength are scanned. Those signals with the proper identifying code are logged by the scanning receiver, and when the strength of the signal received by the non-scanning receiver has fallen below the predetermined minimum, the strongest and best suited of the logged signals is selected and the second scanning receiver is then locked onto that signal.

BRIEF DESCRIPTION OF THE DRAWINGS

The invention is described in greater detail in the following description of examples embodying the best mode of the invention, taken in conjunction with the drawing figures, in which:

FIG. 1 is a schematic illustration of a ground transmitter for transmitting signals to a mobile receiving unit, the figure illustrating both single and multiple program channel operation, FIG. 2 is a schematic illustration of a mobile receiving unit configured to receive signals from the transmitter of FIG. 1, and including both single and multiple program channel receipt, FIG. 3 is a graphic example of operation of the system and process according to the invention.

DESCRIPTION OF EXAMPLES EMBODYING THE BEST MODE OF THE INVENTION

Figure 4:
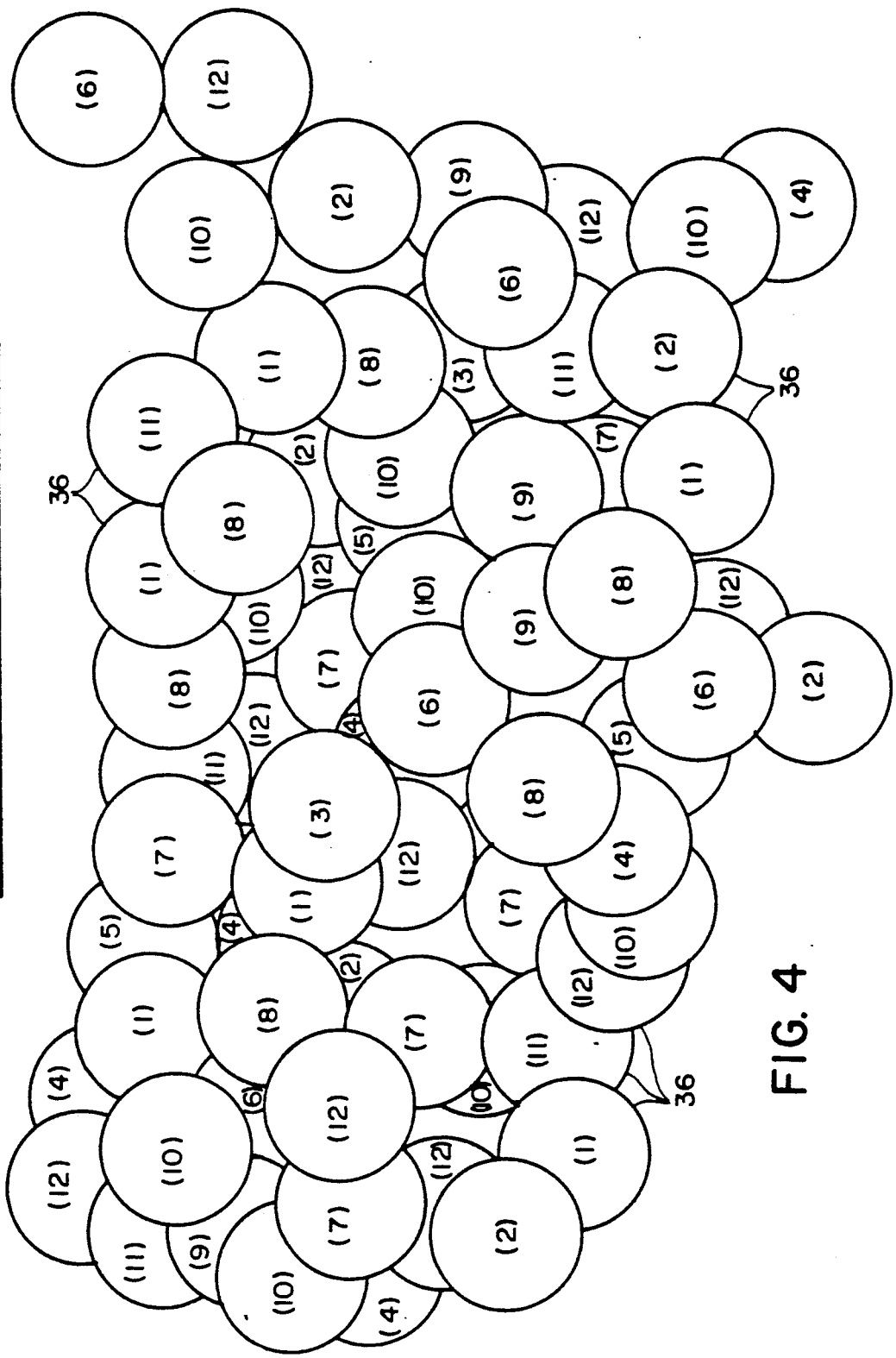
FIG. 4 is a schematic illustration of transmitting sites as disposed across the United States to permit cross country air receipt of program information.

As noted above, the present invention is described primarily in relation to receipt of program information by an aircraft travelling cross country. Thus, the following description speaks largely in relation to air travel, using terminology such as channels, radio signals, and the like. It will be evident to one skilled in the art that the concepts of the invention are equally applicable to all types of transmission. Such transmission may include radio waves using any frequency or modulation, infrared signals, microwave, light or any other means of transmitting a signal.

FIG. 1 illustrates a typical ground station 10 according to the invention. The ground station includes a signal transmitter 12 which transmits signals to the environment by means of an antenna 14. The transmitter receives signals for transmission in the form of either a single channel input 16, or from a multiplexer 18, which is fed multiple program channel inputs for transmission by the transmitter 12. A plurality of the ground stations 10 are employed, each ground station receiving its program channel or channels via any conventional means, such as by wire, cable, fiber optics, satellite, infrared, or otherwise. Since a plurality of ground stations 10 are employed by the present invention, when multiple program channel inputs are transmitted, it is necessary that a specific program be assigned to the same multiplex channel throughout the network of ground stations 10 for consistency throughout the path of travel of any vehicle.

Preferably, each ground station 10 has its transmitter 12 coded to identify the transmitter as a transmitter of a network of the ground stations 10. Coding of the transmitted output from the transmitter 12 can be by in band or out of band tones, or by any other method which a mobile receiving unit can identify signals from the transmitter as being from a transmitter of a network of the ground stations 10.

In a typical ground station installation, each of the ground stations 10 transmit signals radially to an aircraft for a distance of approximately 250 miles depending on the altitude of the aircraft. Thus, each ground station 10 has an extent of approximately 500 miles through which a travelling aircraft can be attached to the ground station for receipt of program information. It will be evident that because the area encompassed by the signals of a ground station 10 is circular, it is necessary due to the various altitudes that aircraft fly that ground stations have overlapping areas, not only for continuity throughout the area being traversed, but also to assure that, as will be later evident in the continuing description below, an appropriate ground station is poised for selection once the signal strength of a ground station locked onto has diminished below a particular signal strength.

Each travelling aircraft includes one mobile receiving unit 20, as illustrated in FIG. 2. Each mobile receiving unit 20 includes an antenna 22 which, through a splitter 24, feeds received signals to a pair of scanner receivers or scanning receivers 26. The scanner receivers 26 are controlled by a switching control module 28, the output of the switching control module then being either on a single program channel output 30, if only a single channel is broadcast and received, or from a de-multiplexer 32 if multiple program channels are broadcast. Typically the de-multiplexer 32 is used since multiple programs are received, and thus the line 30 is eliminated.

The splitter 24 is a typical splitter which simply splits signals from the antenna 22, sending identical signals to each of the scanner receivers 26. Each of the receivers 26 is configured conventionally to scan the frequency band used by each of the ground stations 10. Each of the receivers 26 (or the switching control module 28, discussed below) is configured to maintain a log of signals received and the strength of those signals when the signals exceed a predetermined level, along with other pertinent data. Also, since the signals from each ground station 10 are preferably coded, each of the scanner receivers 26 (or the switching control module 28) also includes a decoder so that only coded signals are recognized by each of the scanner receivers 26.

The switching control module 28, which may be a programmed computer or a specially constructed module, controls operation of each of the scanner receivers 26. The switching control module 28 is configured to cause one of the scanning receivers 26 to lock onto signals transmitted from one of the ground stations 10 while the other scanner receiver 26 scans all signals from ground stations in the proximity, logging the signals and their strength, doppler shift and phase angle. The switching control module is configured to compare the strength of the signals locked onto by the one scanner receiver 26 with a predetermined minimum signal strength. The comparison typically is on a signal-to-noise ratio basis, and once the noise of the received signal exceeds a predetermined minimum, the switching control module 28 is configured to cause the second or scanning scanner receiver 26 to lock onto the best suited signal being received by that scanner receiver at that time. The switching control module 28 is configured to then release the first scanning receiver from being locked onto the now-weak signal, permitting that scanner receiver 26 to then begin scanning signals received from the various ground stations 10 in the proximity. Thus, the relationships of the two scanner receivers 26 are controlled by the switching control module 28 such that one scanner receiver 26 is locked onto signals received from one of the ground stations 10, while the other scanner receiver 26 is scanning the remaining ground stations 10 in the proximity to determine the best suited signal for eventually locking onto a new signal once that locked onto by the other scanner receiver 26 falls below a predetermined minimum.

Initially, when flight just begins, the switching control module 28 causes both scanner receivers 26 to scan, and locks only one onto the strongest signal received, allowing the other to continue scanning. At all other times, one of the scanner receivers is locked onto a signal while the other scans, and vice versa.

All of the elements 12, 14, 18, 22, 24, 26, 28 and 32 of the invention can be well-known transmitters, scanner receivers, etc. as the case may be, or can be configured specifically to perform the various features and functions of the invention. Given the description of the invention as contained herein, one skilled in the art can readily assemble the elements of the invention to produce the claimed results. Some examples of some such elements are found in the applicant's U.S. Pat. No. 4,419,766, the disclosure of which is incorporated herein by reference.

A simplistic example of operation of the invention is illustrated in FIG. 3 with an aircraft 34 shown at four points of travel in relation to four different ground stations 10. The direction of flight of the aircraft 34 is shown by the arrow in the figure.

When the aircraft 34 is located at point 1, the switching control module 28 of the mobile receiver unit 20 contained in the aircraft 34 causes one of the scanner receivers 26 to lock onto the first ground station 10, identified by the letter "D". As the aircraft 34 progresses in its flight, the strength of the signal received by the aircraft 34 first increases as the aircraft approaches ground station D, and then begins to diminish as the aircraft progresses beyond the ground station D. During the entire time, while the switching control module 28 causes one of the scanner receivers 26 to be locked onto signals from the ground station D, the other scanner receiver 26 is constantly scanning the signal strength of other ground stations 10, including the ground station C next in the path of the aircraft 34.

As the aircraft 34 reaches point 2 in its flight path, the signal from the ground station D has diminished to the point where the switching control module 28 recognizes that the signal falls below a predetermined minimum. At point 2, the scanning scanner receiver 26 will have logged signals being received, including the best signal as being that from ground station C. At point 2, therefore, the switching control module 28 causes the second scanner receiver 26 to lock onto the ground station C. At the same time, the switching control module 28 releases the first scanner receiver, which was locked onto the ground station D, permitting the first scanner receiver 26 to resume scanning of signal strength from available ground stations 10.

As the aircraft 34 progresses, the signal strength of the ground station C increases as the aircraft approaches the ground station, and then decreases as the aircraft 34 progresses beyond the ground station C. At point 3, the signal received from the ground station C has fallen below the predetermined minimum, and the switching control module 28 then causes the scanning scanner receiver 26 to lock onto the strongest next signal, that emanating from ground station B. The scanner receiver 26 locked onto ground station C is then released to recommence scanning of signals from available ground stations 10.

Again, as the aircraft progresses in its flight, the signal received from the ground station B increases in strength as the aircraft 34 approaches the ground station, and then begins to diminish as the aircraft 34 leaves the proximity of the ground station B. At point 4, again the signal received from the ground station B falls below the predetermined minimum, and the switching control module 28 of the mobile receiver unit 20 within the aircraft 34 causes the scanning scanner receiver 26 to lock onto ground station A, releasing the other scanner receiver 26 from being locked onto ground station B to continue the process of scanning available signals from ground stations 10 in the proximity. This process is repeated throughout the flight path of the aircraft 34.

In some areas, when transferring from the influence of one ground station to another, the signal strength of the ground station to which the switching control module 28 of the mobile receiver unit 20 of the aircraft 34 has locked onto may fall below the predetermined minimum, but the signal strength received from the next strongest ground station 10 may not be sufficiently strong. In this instance, the switching control module 28 simply remains locked onto the ground station 10 to which it has been locked until signal strength from the next ground station 10 is sufficiently strong for transfer to that ground station. In this manner, a consistent flow of program or other information will continue throughout the flight path of the aircraft 34.

Turning to FIG. 4, the transmission areas 36 of a series of ground stations are illustrated. The present invention utilizes ground stations transmitting in the 800 to 900 MHz range or other frequency band. Different frequencies are transmitted by the various ground stations 10, the numbers in FIG. 4 indicating a particular assigned frequency for each transmission area 36. It is clear from FIG. 4 that ground transmitters 10 within a predetermined proximity to one another where signals can interfere are assigned non-interfering channels. The channels can therefore be repeated periodically so long as the same channel frequencies do not overlap in any one area. In this manner, the entire country can be blanketed adequately so that transmission loss does not occur. For example, when travelling from Chicago to Denver, Chicago is shown in FIG. 4 as transmitting on channel 2. An aircraft thus would be locked onto channel 2, transferring typically to channel 12, then channel 7, then channel 3 and finally channel 12 when reaching Denver. Similar transfer patterns would occur for other travel routes.

It will be evident that the system according to the invention, using common elements to perform the functions according to the invention or custom designed elements which perform those functions, provides a versatile system for permitting a mobile unit, whether an airplane or other travelling entity, to travel over great distances while receiving a continuous program flow of voice, music, data, control signals, video or other communications. Various changes can be made to the invention without departing from the spirit thereof or scope of the following claims.

What is claimed is:

1. A system for continuous reception of information by a mobile receiver unit, comprising a. a plurality of spaced transmitters each having means for transmitting signals on a transmission channel, the transmitters within a predetermined proximity to one another being configured to transmit multiple program channels on non-interfering transmission channels, said transmitters within a predetermined proximity transmitting in transmission areas which at least partially overlap, b. a pair of scanning receivers in said mobile receiver unit, each scanning receiver including means for scanning the transmission channels transmitted by said transmitters, and c. means for controlling said scanning receivers, said controlling means including i. means for causing one of said scanning receivers to lock onto signals transmitted from a selected one of said transmitters, ii. means for causing the second scanning receiver to scan the transmission channels transmitted by said transmitters, iii. means for comparing strength of said locked onto signals with a predetermined minimum signal strength, iv. means for causing the second scanning receiver to lock onto signals received from a different selected one of said transmitters when the strength of said first locked onto signals falls below said predetermined minimum signal strength, and v. means for causing said one scanning receiver to commence scanning of the channels transmitted by said transmitters after the second scanning receiver locks onto said signals received.

2. A system according to claim 1 in which at least some of said transmitters each includes multiplexer means for transmitting multiple program channels on the transmission channel of the transmitter, and said mobile receiver unit includes a de-multiplexer connected to said scanning receivers.

3. A system according to claim 1 in which said mobile receiver unit includes a de-multiplexer connected through said controlling means to each scanning receiver.

4. A system according to claim 1 in which each transmitter includes means for encoding said signals, and in which the scanning means of each scanning receiver includes means for recognizing only encoded signals.

5. A system according to claim 1 in which each scanning receiver includes means to log received channels when scanning.

6. A process for continuous reception of information by a mobile receiver unit passing among a plurality of spaced transmitters, each transmitter being configured to individually transmit signals to the receiver unit, the transmitters within a predetermined proximity to one another being configured to transmit multiple program channels on non-interfering transmission channels, with the transmitters within a predetermined proximity transmitting in transmission areas which at least partially overlap, and the receiver unit having a pair of scanning receivers each being capable of scanning the signals transmitted by the transmitters, the process comprising the steps of a. causing one of the scanning receivers to lock onto signals transmitted from a selected one of the transmitters, b. causing the other scanning receiver to scan signals received from said transmitters, c. comparing the strength of the locked onto signals with a predetermined minimum signal strength, d. causing the second scanning receiver to lock onto signals received from a different selected one of the transmitters when the strength of the first locked onto signals falls below the predetermined minimum signal strength, and e. causing the first scanning receiver to commence scanning of signals received from said transmitters after the second scanning receiver locks onto signals received from the different selected one of the transmitters.

7. A process according to claim 6 in which steps c through e are repeated alternately between said scanning receivers such that one scanning receiver is locked onto signals from one transmitter and the other scanning receiver is scanning signals from other of the transmitters.

8. A process according to claim 6 including an initial step, before method step a, of causing both scanning receivers to scan signals received from the transmitters.

9. A process according to claim 6 including, during method step b, logging received signals from said transmitters.

10. A process according to claim 9 including logging received signals exceeding a predetermined signal suitability.

11. A process according to claim 6 in which the signals transmitted by each transmitter are multiplexed, and method step a includes de-multiplexing the locked onto signals.

12. A process according to claim 6 in which the signals transmitted by each transmitter are coded, and method steps a and d including locking onto coded signals.

13. A process according to claim 12 in which method steps b and e include scanning only of coded signals.

14. A process according to claim 9 in which the signals transmitted by each transmitter are coded, and method steps a and d including locking onto coded signals.

15. A process according to claim 14 in which method steps b and e include scanning only of coded signals.

* * * * *